United States Patent [19]

Guziak et al.

[11] Patent Number: 4,726,024
[45] Date of Patent: Feb. 16, 1988

[54] FAIL SAFE ARCHITECTURE FOR A COMPUTER SYSTEM

[75] Inventors: Robert A. Guziak, Monroeville; Edward K. Prem, Glenshaw, both of Pa.

[73] Assignee: Mieczyslaw Mirowski, Owings Mills, Md.

[21] Appl. No.: 846,159

[22] Filed: Mar. 31, 1986

[51] Int. Cl.⁴ .............................................. G06F 11/00
[52] U.S. Cl. ...................................... 371/16; 364/200
[58] Field of Search ............... 371/16, 9, 21; 364/200, 364/900

[56] References Cited

U.S. PATENT DOCUMENTS

| | | | |
|---|---|---|---|
| 4,334,307 | 6/1982 | Bourgeois et al. | 371/16 |
| 4,625,313 | 11/1986 | Springer | 371/16 X |
| 4,641,308 | 2/1987 | Sacarisen et al. | 371/16 |
| 4,646,298 | 2/1987 | Laws et al. | 371/16 |

Primary Examiner—Charles E. Atkinson
Attorney, Agent, or Firm—Fleit, Jacobson, Cohn & Price

[57] ABSTRACT

The fail safe architecture for a computer system includes a read only memory (ROM) self-check module, a random access memory (RAM) self-check module and operation code instructions (op code) self-check module which are actuated periodically by a non-maskable interrupt (NMI) to a microprocessor. The microprocessor then suspends the current applications routine being executed. If the self-check module detects a failure, the microprocessor enters a fail safe trap routine which initially resynchronizes the operation of the microprocessor and then delays the generation of a critical timing pulse (fail safe trigger) with a series of "jump to yourself" steps. The fail safe trigger signal activates a device which sends a fail safe square wave to a narrow bandwidth, digital, band-pass filter. If the fail safe square wave signal is not supplied to the filter during a prescribed period of time, a set of transistor switches, interposed between the computer system power suppy and the voltage regulator for the computer system, is not actuated and power is cut off to the computer system. Otherwise, if the fail safe signal is received within the prescribed window of time, switches are actuated to couple the power supply to the computer system.

32 Claims, 14 Drawing Figures

FIG. 3
TWO PATH BRANCH TEST

TWO PATH BRANCH TEST

FAIL SAFE EXECUTIVE ROUTINE

FAIL SAFE TRAP ROUTINE

SELF CHECK MODULE EXECUTIVE ROUTINE

ROM SELF-CHECK MODULE

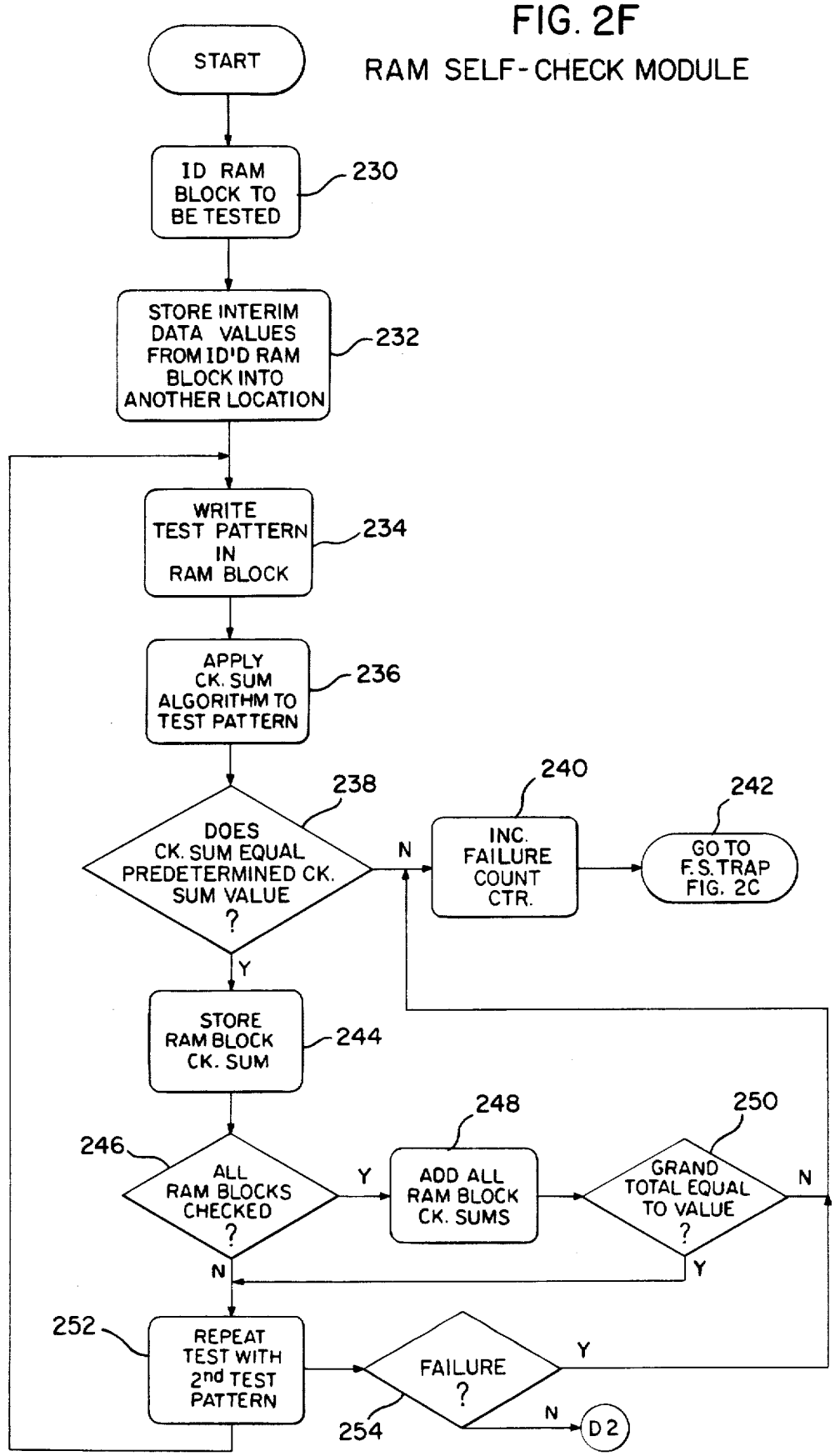

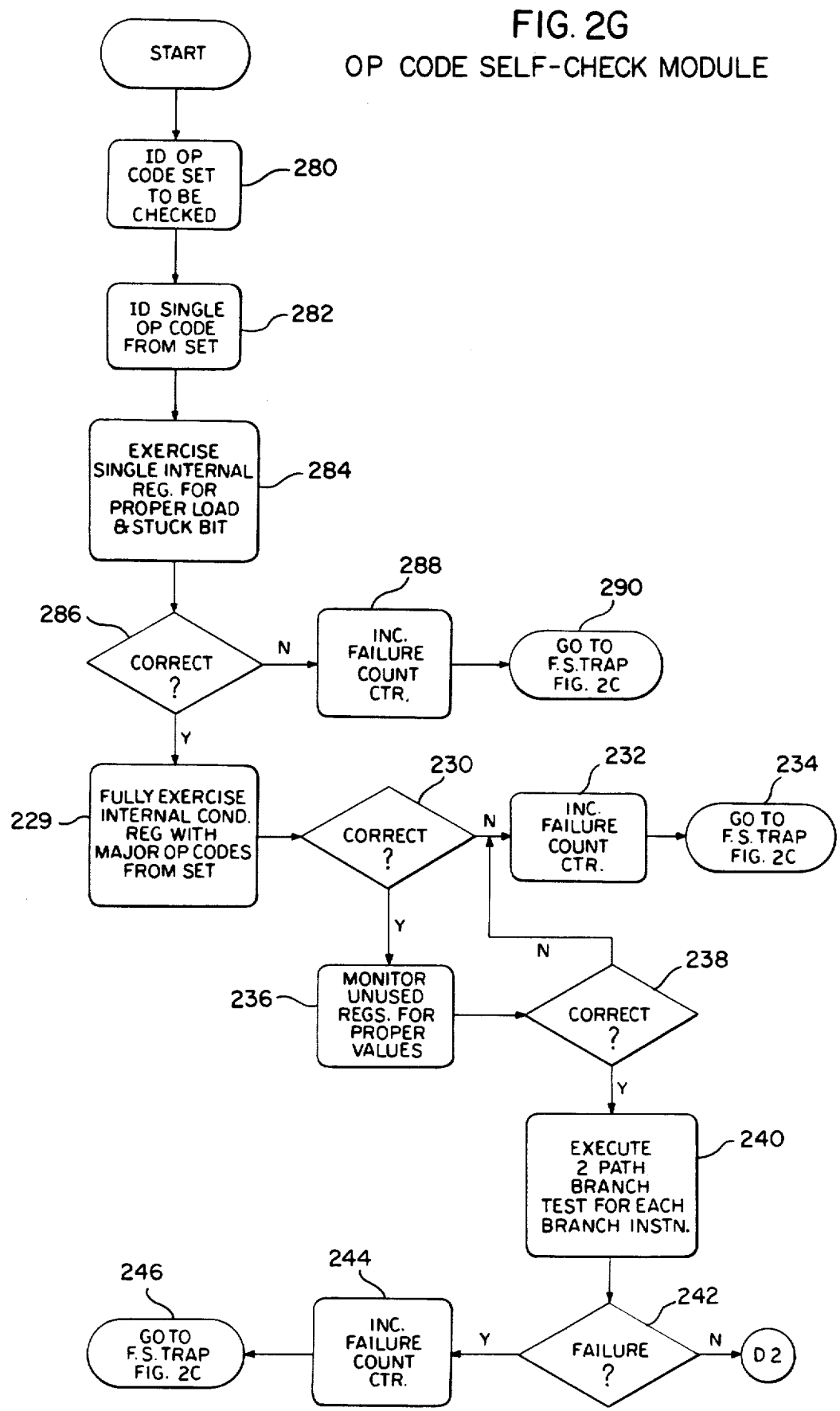

FAIL SAFE ARCHITECTURE FOR A COMPUTER SYSTEM

BACKGROUND OF THE INVENTION

This invention relates to fail safe architecture for a computer system and encompasses both an apparatus embodying the fail safe architecture and a method of fail safe operation of the computer system.

The fail safe architecture for the computer system seeks first to determine whether a failure has occurred in the computer system and then to minimize the consequences of such a failure. In the computer arts, the term "fail safe" is used to designate a system design, the object of which is to eliminate the hazardous effects of component failure or the effects of system environments. Fail safe architecture relates to the interaction between the hardware and the software of the computer system, and relates to means for responding to the detection of a failure or a fault found in the hardware, in the software or in the execution of the software by the processor. The fail safe operation of the computer system relates to a method of detecting a failure in combination with steps which eliminate the deleterious effects of that failure.

Herein, the use of the term "computer system" refers to any type of apparatus which executes instructions in a sequential fashion. A programmable controller, a main frame computer, an automated data processing system, a microprocessor based system and other sequentially operated machines are encompassed by the term "computer system."

OBJECTS OF THE INVENTION

It is an object of the present invention to check the physical and operational integrity of the components of the computer system.

It is another object of the present invention to eliminate the adverse effects of a failure of one or more of the components.

It is another object of the present invention to restrict the operation of the computer system to portions of the computer system which have not been identified as faulty or to inhibit the further operation of the processor of the computer system upon detecting a fault.

It is an additional object of the present invention to provide a recovery operation such that failures, which are transient in nature, do not unduly restrict the operation of the computer system.

SUMMARY OF THE INVENTION

In one embodiment, the fail safe architecture for a computer system includes a read only memory (ROM) self-check module, a random access memory (RAM) self-check module and operation code instructions (op code) self-check module. Nominally, the computer system includes a processor (a microprocessor in the embodiment) with an internal register, op code stored in a ROM, and a RAM which stores intermediate data manipulated by the processor. The ROM and the RAM are divided into blocks which are sequentially tested by respective self-check modules and the op code is divided into sets and subsets which are executed by the processor during a validity check of the operation of the processor.

In general, a non-maskable interrupt (NMI) is generated by a timer and applied to the microprocessor. The microprocessor then suspends the execution of the current software applications routine, stores the intermediate data or operational parameters, and executes an identified self-check module. If the self-check module detects a failure, the microprocessor executes a fail safe trap routine which initially resynchronizes the operation of the microprocessor and then performs a series of "jump to yourself" steps. In this manner, the fail safe trap routine simply delays further execution of any other operation code by the microprocessor. In the meantime, another timer generates a reset signal which commands the microprocessor to re-initialize the components of the computer system. As part of the initialization process, all self-check modules are executed. If this further execution of all self-check modules is successful, i.e., does not detect any failures, the computer system recovers and reinstitutes the suspended applications routine. If one of the self-check modules does detect a failure during the initialization, the microprocessor returns to the fail safe trap routine.

At the conclusion of each self-check module, a fail safe trigger signal is generated and is sent to a third timer. This third timer generates a fail safe square wave signal which is applied to a narrow bandwidth, digital, band-pass filter. If the frequency of the fail safe square wave signal is not within the pass band of the filter, i.e., is not received within a prescribed time window, a pair of transistor switches opens the circuit between the computer system power supply and the voltage regulator for the computer system and power is cut off to the computer system. Otherwise, if the fail safe square wave is received within the prescribed window of time, one or the other switch of the pair of transistor switches is actuated to couple the power supply to the voltage regulator and to the system.

The ROM self-check module and RAM self-check module respectively apply algorithms to the op code stored in the ROM and to a test pattern written into the RAM to determine whether the ROM and the RAM are properly storing instructions and data and are operable. The op code self-check module first checks the operation of the internal register by walking a "one" through the register and then executes discrete subsets of the op code set and monitors the condition of the internal register. The branch instructions in the op code set are put through a two-path branch test. Also, each software applications routine includes a unique application code word which is stored in three memory locations at the beginning of the applications routine. A check routine, randomly placed in the applications routine, checks the stored applications code word against a check code word. If the check code word does not match the stored applications code word, the applications routine jumps to the fail safe trap routine.

BRIEF DESCRIPTION OF THE DRAWINGS

The subject matter which is regarded as the invention is particularly pointed out and distinctly claimed in the concluding portion of the specification. The invention, however, together with further objects and advantages thereof, may best be understood by reference to the following description taken in conjunction with the accompanying drawings in which:

FIGS. 2A-G generally illustrate flowcharts of the fail safe routines;

DETAILED DESCRIPTION

Figure 1:
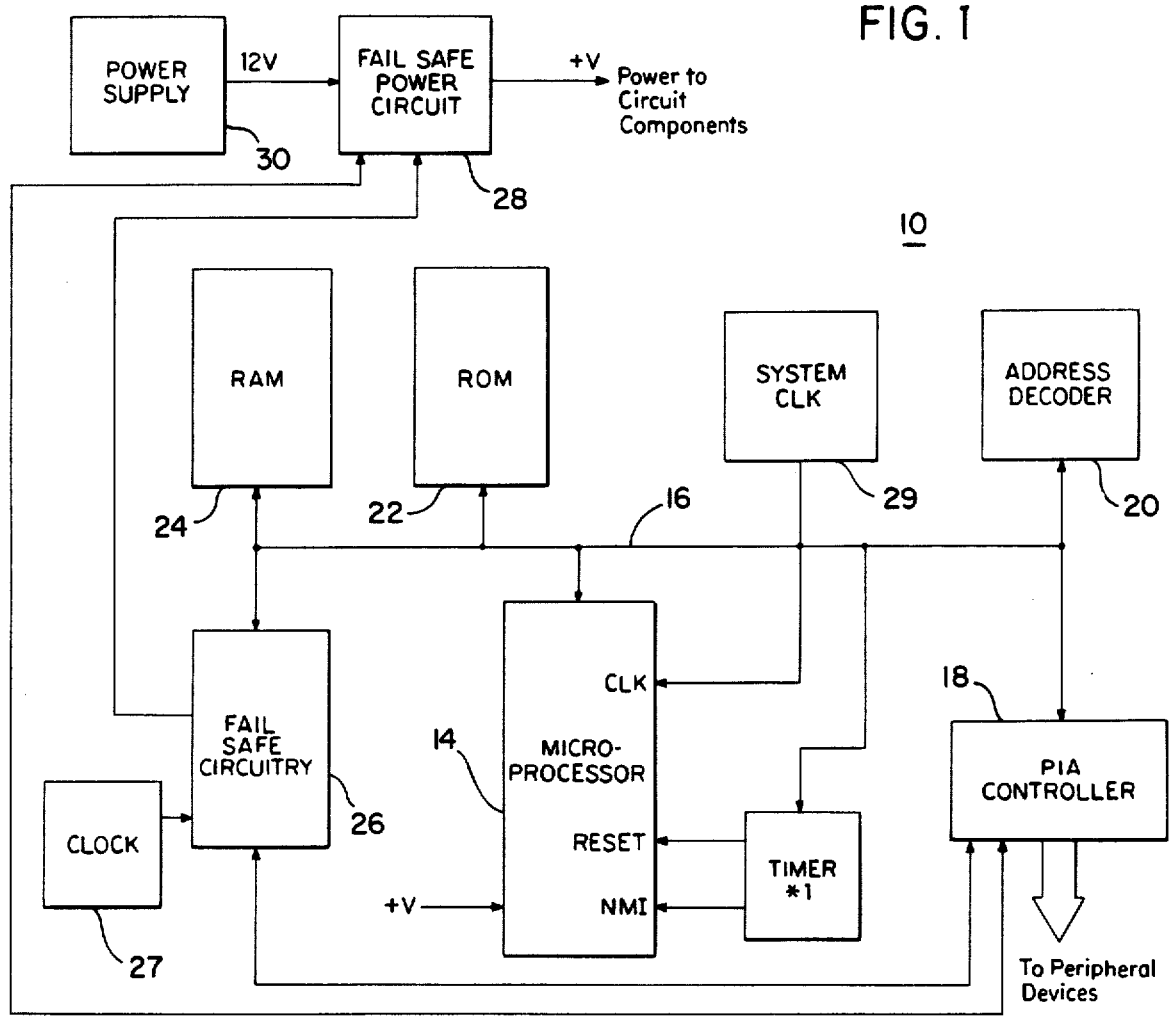
FIG. 1 is a block diagram of a microprocessor based computer system incorporating the fail safe architecture hardware.

The present invention relates to fail safe architecture for a computer system and also to the fail safe operation of the computer system. The fail safe architecture takes into consideration the possible modes of component failure, the finite probability of failure, and the architecture utilizes closed loop detection to ensure that, if a component fails, the computer system is placed in a restrictive mode of operation or is disabled to ensure that the failure will not affect the environment within which the computer system is operating.

The fail safe architecture generally can be viewed as interacting with three segments of the computer system: the computer hardware (i.e., a processor, a microprocessor, a programmable controller, memory units, decoders, peripheral devices or other interface circuits); computer software (i.e., software applications routines or any type of sequential instruction which determine the operation of the computer hardware, whether stored in a read only memory (ROM) or stored in a random access memory (RAM)); and an external monitor circuit, which in the present invention is the fail safe circuitry. These three segments of the computer system interact with each other on the basis of time.

The fail safe architecture described herein is applicable to a wide range of computer systems. However, in the embodiment illustrated in FIG. 1, computer system 10 includes microprocessor 14, which is coupled via bus 16 to peripheral interface adapter (PIA) controller 18, to address decoder 20, to ROM 22, to RAM 24 and to fail safe timer *1. A system clock 29 generates system clock pulses which are applied to the microprocessor and, although not shown, to other components of system 10. A separate clock 27 supplies signals to fail safe circuitry 26.

Fail safe timer *1 interacts with microprocessor 14 normally by generating an interrupt signal as a nonmaskable interrupt (NMI) to the microprocessor and also by generating after error detection a reset signal to the microprocessor which causes system 10 to be reinitialized. The microprocessor NMI software controls the PIA (18) output. The output of PIA 18 is applied to fail safe power circuit 28 which in turn is interposed between power supply 30 and the +V power inputs of the components of system 10.

As is known by persons of ordinary skill in the art, system 10 may include significantly more components than illustrated in FIG. 1. Similarly, certain components could be eliminated.

By way of introduction, the fail safe architecture operates in the background as a transparent entity in system 10 and does not interfere, if no faults are discovered, in the operation of the system. For example, to obtain data input from a keyboard (not shown), microprocessor 14 executes a read keyboard routine stored in ROM 22. Such a routine is embodied by a group of operation code instructions stored in ROM 22. The data input from the keyboard is stored on an intermediate basis in RAM 24. Microprocessor 14 processes or manipulates that data by executing another group of operation code instructions (op code) and generating further intermediate data for storage in RAM 24. Thereafter, microprocessor 14 outputs the processed data via PIA controller 18 to another peripheral device, such as a liquid crystal display, by executing a further group of op code stored in ROM 22 and displaying processed data stored in RAM 24.

In general, fail safe timer *1 generates, at a predetermined time, an interrupt signal to the NMI (non-maskable interrupt) input of microprocessor 14. Thereafter, microprocessor 14 suspends the execution of the current software applications routine, stores any intermediate data and operating parameters in RAM 24, and executes a self-check module routine which is stored in ROM 22.

Each self-check module checks a particular element or operation of an element in system 10, for example, checks a block of ROM, checks a block of RAM, or checks the operation of the microprocessor by executing discrete subsets of op code and monitoring the condition of an internal register in the microprocessor. It is to be noted that any type of data storage device can be checked rather than ROM or RAM. If no failure is found (the tests being successfully completed), microprocessor 14 resets a reset timer and the NMI timer in fail timer *1, and PIA 18 activates a fail safe square wave generator timer in circuit 26, which applies the square wave to fail safe power circuitry 28. If timely received, this wave closes one of the pair of switching transistors to maintain a continuous linkage between power supply 30 and the +V power input terminals of the components of computer system 10.

Figure 2A:
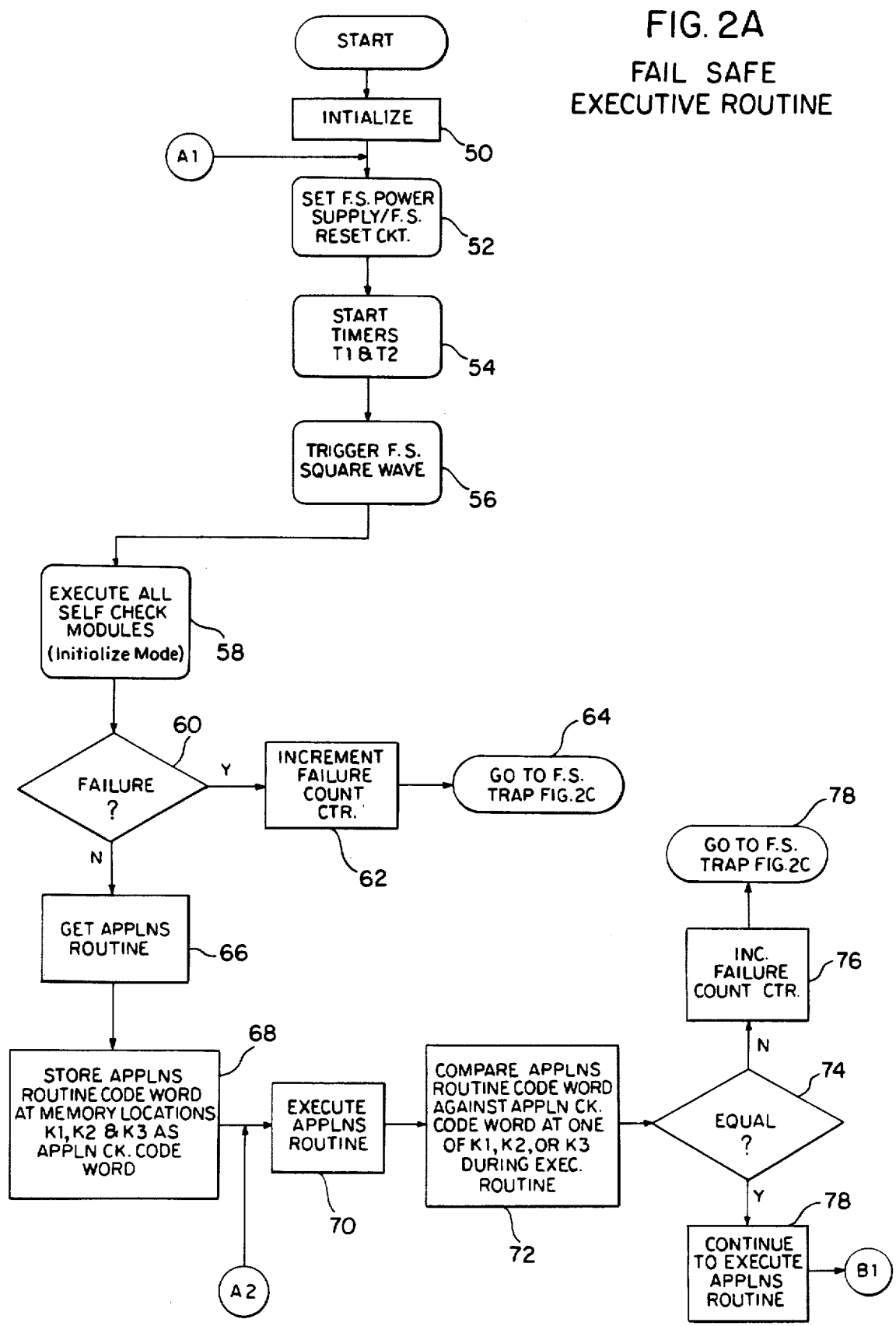
Figure 2B:
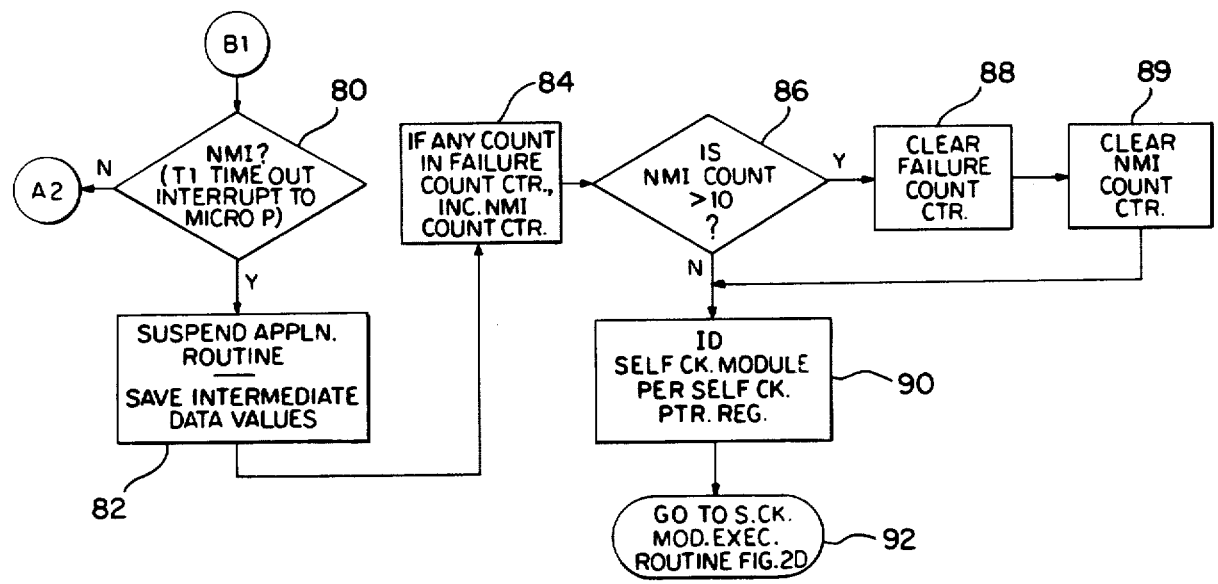

The operation of the fail safe architecture is illustrated by the flowcharts in FIGS. 2A–G. FIGS. 2A and B illustrate the fail safe executive routine which shows the interaction between the specific fail safe routines (self-check modules), the general operating system of computer system 10, and the interaction between those elements and the fail safe hardware circuitry. After computer system 10 is initially powered up, computer system 10 is initialized at step 50. The fail safe power supply/fail safe reset circuit in fail safe power supply circuit 28 is actuated in step 52; this step is described in detail later.

Fail safe circuitry 26 utilizes timers T1 and T2 (not shown in FIG. 1 but identified in steps 54 and 56) as part of timer *1 (shown in FIG. 1). Timers T1 and T2 generate an NMI interrupt signal to microprocessor 14 and a reset signal, respectively. The NMI timer (T1) controls the generation of a fail safe square wave signal through a software interrupt routine. The hardware output is generated in PIA 18 and is supplied to fail safe circuit 26; the power control is applied to fail safe power supply circuit 28. NMI timer T1 and reset timer T2 are started in step 54.

Figure 2C:
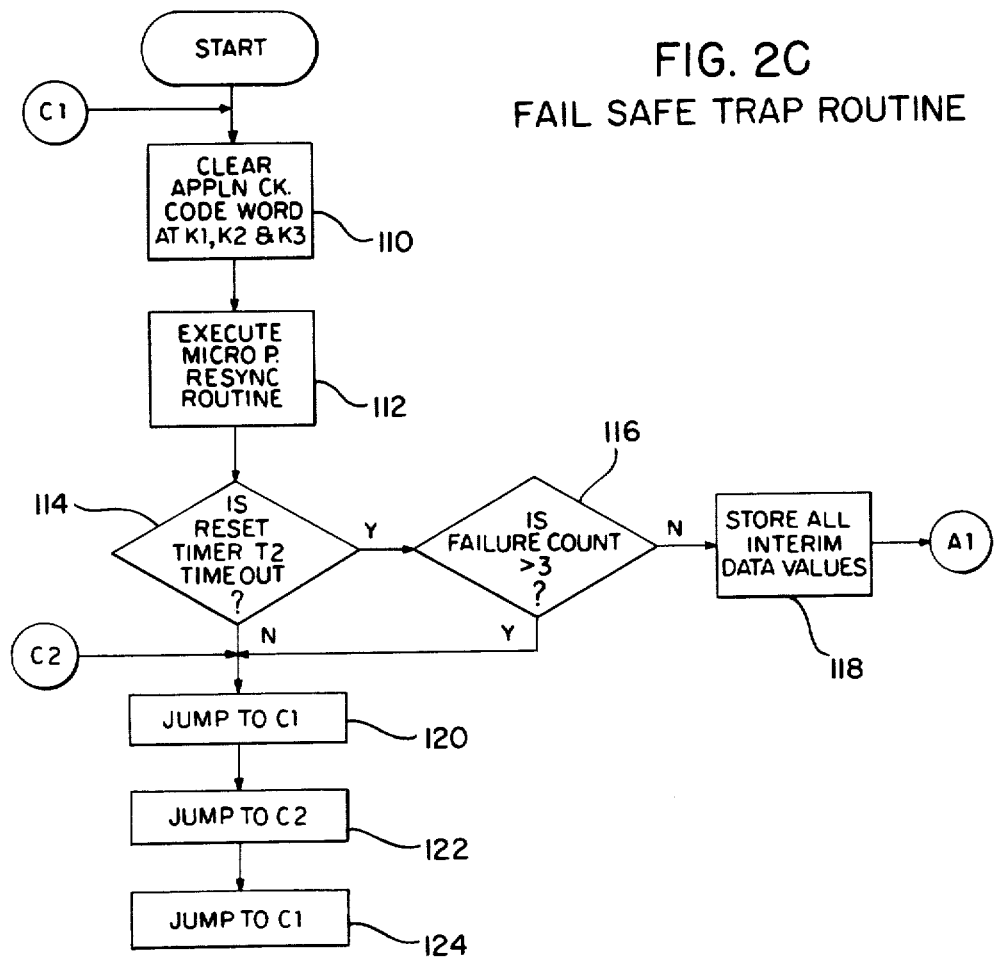

In step 58, all self-check modules are executed in sequential order. If a failure is detected in step 60, a failure count counter is incremented in step 62 and the fail safe executive routine jumps in step 64 to fail safe trap routine (FIG. 2C).

In the absence of a detected failure by any self-check module, microprocessor 14 obtains a designated applications routine in step 66. At the beginning of each applications routine, which is composed of a group of op code stored in ROM 22, the applications routine stores a special applications code word at memory locations K1, K2 and K3 in RAM 24 as applications check code words (step 68). Thereafter, the applications routine is executed (step 70).

In order to check the operation of the applications routine and in order to identify a runaway or processor out-of-control situation, the applications routine periodically and randomly compares an applications routine code word against the applications check code word at one of the memory locations K1, K2 or K3 (step 72). This type of failure sometimes occurs when address or data information is in someway corrupted such that data is interpreted as instructions and/or instructions are interpreted as data. By randomly comparing the applications code word against the stored applications check code word, the address and data information are verified and the operation of the microprocessor is validated. If the comparison is not favorable per step 74, the failure count counter in step 64 is incremented and the fail safe routine jumps to the fail safe trap routine per step 78. Otherwise, if the comparison is favorable, the applications routine is further executed by microprocessor 14 in step 78. Flowchart character B1 identifies the correlation between FIGS. 2A and 2B. It is recognized by persons of ordinary skill in the art that this applications check code sub-routine can be accessed several times during the execution of the applications routine. Although not shown, before a particular applications routine executes any critical step, such as sending a signal to a device external to computer system 10, the applications routine checks the applications code word at locations K1, K2 and K3. If the check code word is not confirmed, the critical step is not taken and the system enters the fail safe trap routine.

Decision step 80 determines whether NMI timer T1 has timed out and whether the NMI interrupt signal has been applied to microprocessor 14. The NMI timer is independent of the operation of system 10 except for the receipt of the clocking pulses. In the absence of the NMI interrupt, the fail safe executive routine returns to step 70 as illustrated by flowchart character A2. In the presence of an NMI interrupt, the applications routine is suspended and intermediate data values (intermediate computational information) are saved per step 82. In step 84, an NMI count counter is incremented if any count is present in the failure count counter and decision step 86 determines whether the NMI count is greater than 10. If the count is greater than 10, the failure count counter and the NMI count counter are cleared in steps 88 and 89; if the count does not exceed 10, step 90 identifies the self-check module to be executed per the self-check pointer register. Step 92 provides a jump to the self-check module executive routine of FIG. 2D. As will be discussed later, the self-check module executive routine is, in this embodiment, not an independent routine but is part of each self-check module routine. The self-check module executive routine is presented herein to describe the steps common in each self-check module.

FIG. 2C illustrates the flowchart for the fail safe trap routine which is accessed every time a failure is detected. Initially, in step 110, the fail safe trap routine clears the applications check code word from memory locations of K1, K2 and K3. In step 112, a microprocessor resynchronization routine is executed. The resynchronization routine is designed to resynchronize the microprocessor when the address words and/or the data words are out of sync with the operation of the microprocessor. One routine for resynchronizing the microprocessor is to utilize a series of single byte op code instructions. For example, assuming an instruction is six bytes long, and assuming the microprocessor is starting at the second byte rather than the first (an out of sync condition), a series of six, single byte instructions are utilized such that the microprocessor recognizes each byte as an instruction. This series of instructions resynchronizes the operation of the microprocessor. The out of sync condition may be caused by a defective component affecting the address or data lines, may be caused by a bad solder joint at one of the pin connections of the components, or may be due to a short trace on a printed circuit board. Also, the out of sync operation of the microprocessor may be transient in nature rather than a permanent failure; hence, the fail safe trap routine executes resynchronization routine 112.

Decision step 114 is a hardware function that determines whether reset timer T2 has timed out. Timers T1 and T2 are initially set during the initialization of computer system 10. Each timer T1 and T2 counts independently of the operation of microprocessor 14 and depends solely upon the clock input from clock 29. Each timer (T1 and T2) is reinitialized by a fail safe trigger signal at the conclusion of each self-check module. Reset timer T2 has a longer countdown period as compared with NMI timer T1.

Reset timer T2 enables computer system 10 to recover in face of a transient failure. In the presence of a reset signal from reset timer T2, microprocessor 14 generally initializes the computer system by executing all self-check modules. Decision block 116 determines whether the failure count is greater than three. If the failure count is less than three, step 118 stores all interim data values and flowchart character A1 provides a return to the fail safe executive routine (FIG. 2A) prior to step 52.

If the initially detected failure is transient in nature and is corrected by the reinitialization, the reexecution of all of the self-check modules in step 58 will not detect the failure. If the failure is not detected a second time, the microprocessor resumes the suspended applications routine. The failure count counter monitors how many failures are detected within a predetermined number of NMI interrupt signals. In this embodiment, if three failures are detected within 10 NMIs, the fail safe trap routine goes to step 120 which is jump to itself, i.e., to flowchart character C1; goes to step 112 which is jump to flowchart character C2; and goes to step 124 which is jump to point C1. In this manner, fail safe trap routine delays the generation of a fail safe trigger signal at the conclusion of each self-check module which triggers fail safe square wave output from PIA 18. In the absence of the fail safe square wave, fail safe power circuit 28 does not couple power supply 30 to the power inputs of the components in computer system 10. Therefore, NMI timer T1 is the means for periodically activating the self-check modules. The fail safe square wave, in cooperation with fail safe power circuit 28, operates as means for inhibiting the execution of operation code instructions by the processor dependent upon the successful testing and checking by the self-check modules.

Figure 2D:
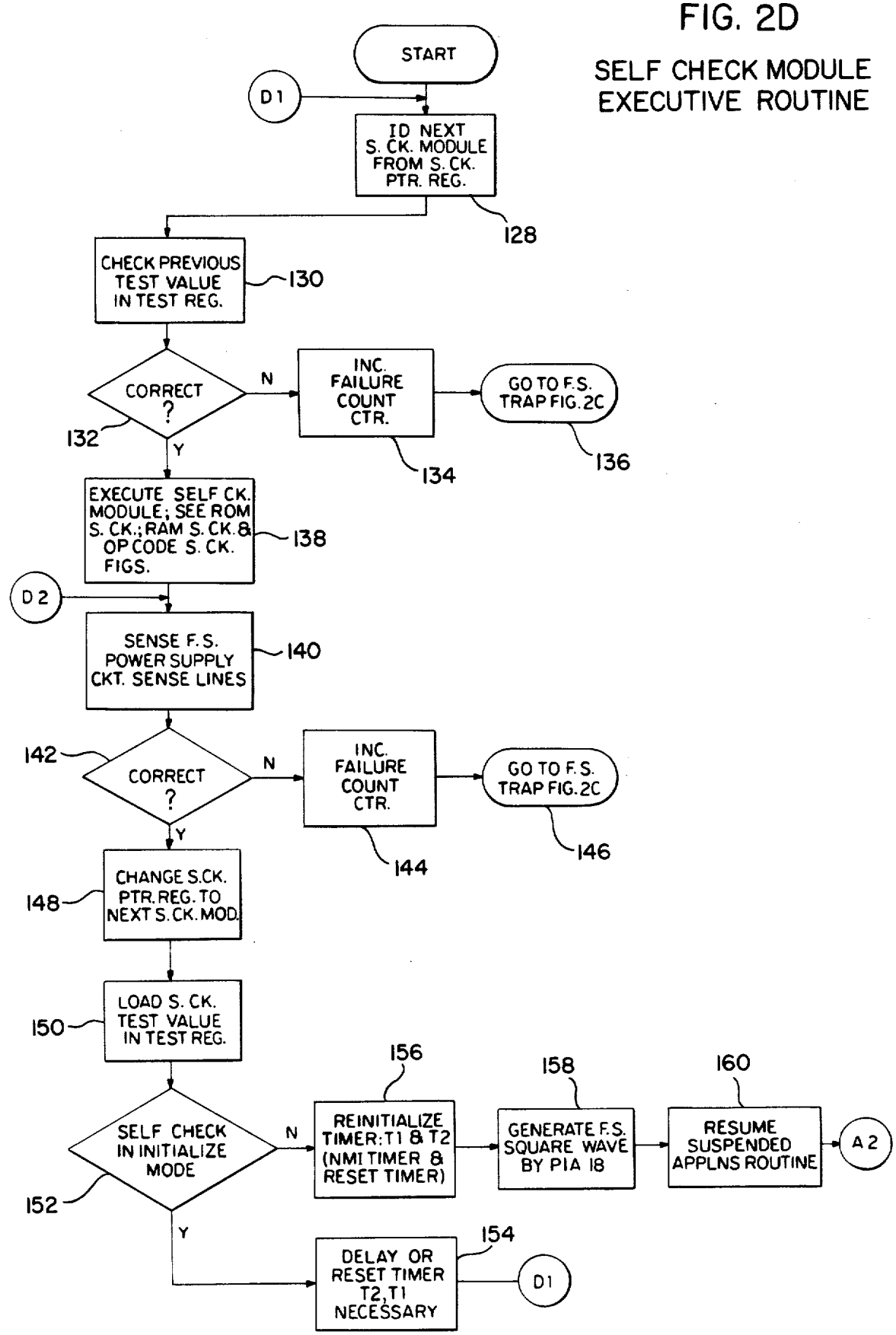

FIG. 2D illustrates a flowchart of the operation of the self-check module executive routine. As stated earlier, each self-check module includes the steps delineated in this executive routine; the executive routine is presented herein only to illustrate the common steps in all the self-check module routines. (See FIGS. 2E-G.)

Initially, the self-check module executive routine identifies the next self-check module to be executed as shown in the self-check pointer register (step 128). In step 130, the routine checks the test value, previously stored in the test register by the previously executed self-check module, against a current test value. If the test value is incorrect (step 132), the failure count counter is incremented (step 134) and the routine jumps to the fail safe trap routine (step 136). If the test value is correct, the identified self-check module is executed in step 138. As will be discussed later, at the end of each self-check module, the self-check pointer register is updated to identify the next self-check module to be executed and a test value unique to the currently executed self-check module is loaded into the test register. Therefore, before the execution of each self-check module, the test value from the previous self-check module is confirmed. The self-check module routines for the ROM, RAM and op code are discussed later with respect to FIGS. 2E, F and G.

Assuming no fault is found by the self-check module in step 140, the routine senses or monitors the fail safe power supply circuit sense lines. These sense lines are described later with respect to FIGS. 4A and 4B. If the state of the sense lines is incorrect (step 142), the failure count counter is incremented (step 144) and a jump is made to fail safe trap routine (step 146). If the correct signal is sensed on the sense lines, step 148 changes the self-check pointer register to point to the next self-check module routine. In step 150, the self-check test value is loaded in the test register; that value is unique to the successfully executed self-check module.

Step 152 determines whether the self-check module is being executed in an initialization mode (per step 58 of FIG. 2A, the fail safe executive routine) and, if so, the proper delay or the resetting of timers T2 and T1 is recognized in step 154. The self-check executive routine then jumps per flowchart character D1 to step 128. If the self-check executive routine is not in the initialization mode, reset timer T2 and NMI timer T1 are reinitialized in step 156; a fail safe control is sent to fail safe square wave output device PIA 18 in step 158. Timer T1 is loaded with half the fail safe square wave period. The output from the fail safe PIA circuit 18 (FIG. 1) is high one half of the fail safe square wave period and low the second half of the fail safe square wave period (a 50% duty cycle). If timer T1 is not reinitialized by the particular self-check module, the output from fail safe PIA 18 does not produce a square wave of the proper frequency, fail safe circuitry 26 detects a fault and fail safe power circuit 28 does not switch on one of the switching transistors and hence power is not supplied from supply 30 to the +V power inputs of the components of computer system 10.

In step 160, the suspended applications routine is resumed and flowchart character A2 shows that the program goes to the fail safe executive routine, step 70, FIG. 2A. Of course, the resumption of the suspended applications routine implies that the stored intermediate data values and operational parameters are restored by microprocessor 14 to the various components unique to that applications routine. In this fashion, the fail safe architecture works in the background and is transparent to the execution of operation code instructions by microprocessor 14.

The fail safe architecture takes into account the following processor (microprocessor 14 or central processing unit) internal failures: program counter stuck, program counter jumps by $2^N$, program counter load error, program counter utilizes random increments, index register stuck, index register increment and decrement is random, index register is improperly loaded, stack pointer stuck, stack pointer has random value, and a register is stuck or a register is improperly loaded. The following address failures are also taken into account by the fail safe architecture: a short or an open circuit in the address line or address bus, electromagnetic interference or radio frequency interference noise on the bus, capacitive or inductive noise on the bus, and a defect in the address decoding circuit. Of course, the data on the data buses could also be affected by similar problems as identified with respect to the address bus. Data failure modes are taken into account by the fail safe architecture such as: corruption during read/write operations, especially a soft or transient failure, permanent or hard failure due to corruption during read/write operations, and a shorted or open circuit on the data line or bus. Timing failures include: oscillator failure, internal sequence failure, and shorted or open circuit timing signal line. The fail safe architecture also monitors for logical failure due to defective internal logic in microprocessor 14.

The fail safe software in this embodiment generally consists of three types of self-check routines: the ROM self-check routine FIG. 2D; the RAM self-check routine FIG. 2F; and the op code self-check routine FIG. 2G.

In this embodiment, the ROM is divided, for purposes of the fail safe architecture, into blocks of ROM. Similarly, the RAM is divided into blocks of RAM for purposes of the fail safe architecture. Lastly, all the op code utilized by computer system 10 are divided into sets and those sets are further divided into subsets. In general, the ROM self-check routine verifies the contents of one block of RAM by applying an algorithm to the op code stored therein. At the next NMI interrupt signal, the RAM self-check module tests the integrity of one block of RAM by saving the current data stored in that block of RAM, writing a first test pattern into the block and algorithmically verifying that test pattern, writing a second test pattern into the block and verifying that test pattern, and restoring the current data into that block of RAM. At the third NMI interrupt, the op code self-check module initially checks the operation of an internal register, then executes discrete subsets of op code in the op code set and monitors the condition of the internal register during that execution. At the fifth NMI, the second set of op code is checked; at the sixth NMI, the third set of op code is checked and so on and so on until the operation of the microprocessor is validated for all op code utilized by computer system 10. This sequential execution of the self-check modules is called a "self-check sequence cycle" herein. The second self-check sequence cycle performs the ROM self-check routine on the second block of ROM; the RAM self-check routine on the second block of RAM; and the op code self-check module on all the op code sets to validate the operation of the microprocessor.

Figure 2E:
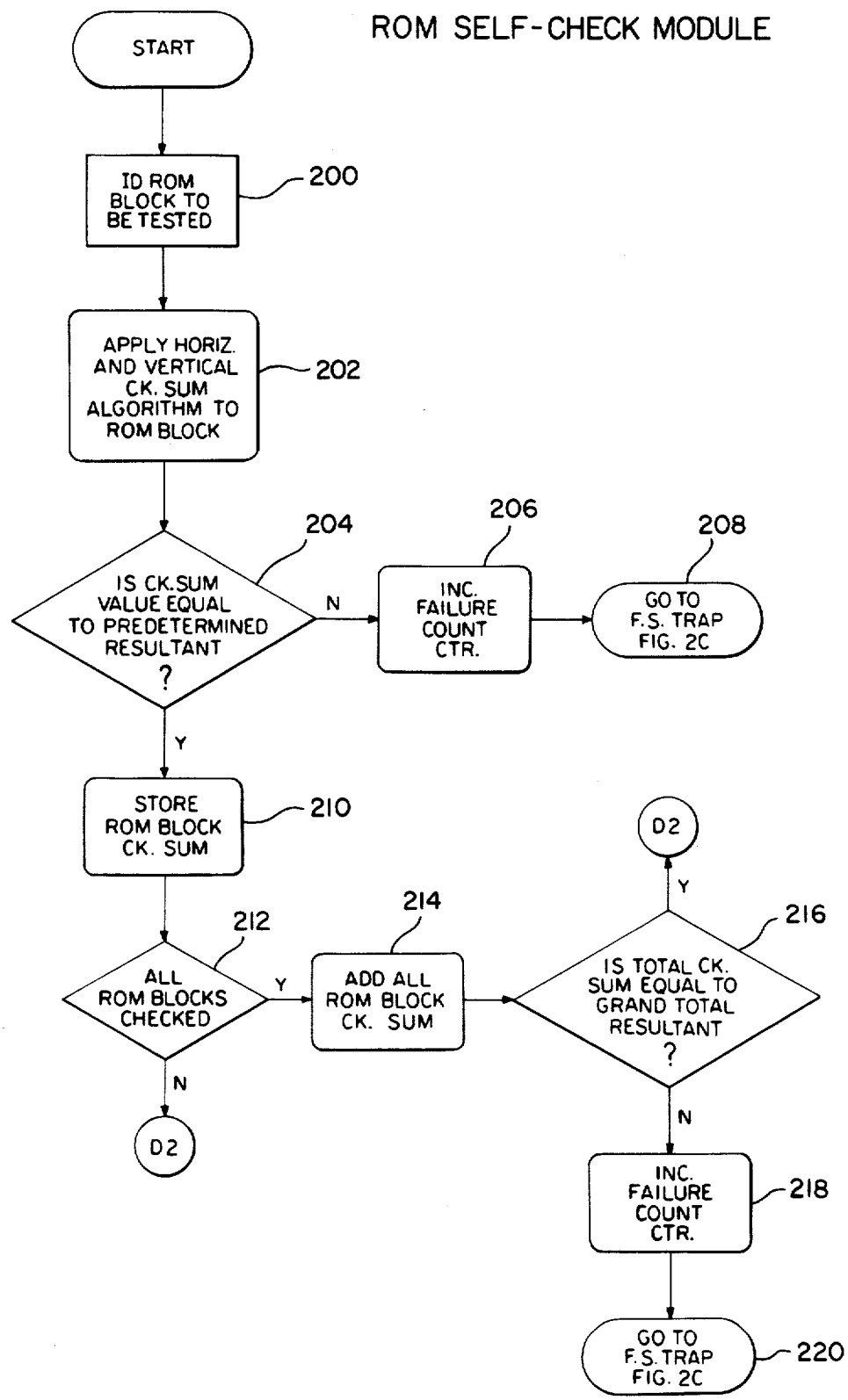

Specifically with respect to FIG. 2E, the ROM self-check module, step 200 identifies the ROM block to be tested. Step 202 applies a horizontal check sum algorithm to the op code stored in the ROM and then a vertical check sum algorithm to the ROM block. The horizontal check sum is compared against a desired resultant value and the vertical check sum is compared against a desired resultant in step 204. If the comparison is unfavorable, i.e., a failure is detected, the failure count counter is incremented in step 206 and in step 208 the fail safe trap routine is accessed. If the check sum values produce the desired resultant, those check sum values are stored as ROM block check sum 1 in step 210. As stated earlier, the ROM is divided into blocks and the op code stored in that block of ROM is verified by applying an algorithm thereto during one self-check sequence cycle. If three ROM blocks are present, three cycles must be executed to check the entire ROM. Decision step 212 determines whether all the ROM blocks have been checked and if not flowchart character D2 directs the program to self-check module executive routine in FIG. 2D, step 140. If all ROM blocks have been checked, all ROM block check sums are added together in step 214 and decision step 216 determines whether the total check sum for the ROM blocks is equal to the grand total resultant. If so, step 140 in self-check module executive routine, FIG. 2D, is accessed. If not, the failure count counter is incremented in step 218 and the program jumps to fail safe trap routine in step 220. Again, the self-check executive routine is an integral part of each self-check module; the executive routine is discussed herein as separate only for purposes of explanation.

As is recognized by persons of ordinary skill in the art, the ROM may store permanent look-up tables and constants utilized by microprocessor 14. Of course, the verification of the contents of the ROM includes checking both the stored op code as well as the stored permanent look-up tables and constants.

Also, a person of ordinary skill in the art recognizes that a number of different algorithms can be used to verify the contents of the ROM. The convolutional code algorithm which obtains the check sums is simply one method of verifying the contents of the ROM. Other more complex convolutional or cyclic redundancy check codes can be utilized. The person of ordinary skill in the art recognizes that, given a particular model ROM by a particular manufacturer, the most probable failure modes for that ROM are discussed in the literature about that ROM. The algorithm chosen to verify the contents of the ROM is dependent upon the most probable failure modes identified for that type of ROM.

Also, the person of ordinary skill in the art recognizes that random access memory (RAM) can be configured to act as a storage means for storing operational code instructions (op code), changeable look-up tables and changeable constants. This specially configured RAM can be tested with the ROM self-check module described above.

FIG. 2F provides the flowchart for the RAM self-check module. As stated earlier, the RAM is divided into blocks of RAM for purposes of the fail safe architecture. Step 230 identifies the RAM block to be tested.

In step 232, the interim or intermediate data values stored in the RAM block are saved or stored in another location in the RAM. A test pattern is written into the RAM block in step 234. In this embodiment, a check sum algorithm is applied to the test pattern in the RAM block in step 236 and a determination is made whether the check sum is equal to a predetermined check sum value (a predetermined algorithmic check sum corresponding to the test pattern) (step 238). An unfavorable integrity check indicates a failure which increments the failure count counter in step 240 and causes the RAM self-check module to jump to the fail safe trap routine in step 242. A favorable or successful integrity check of the RAM block causes a storage of a value, RAM block 1 check sum test 1, in step 244. RAM block 1 check sum test 1 is stored in a location previously checked.

As stated earlier, the RAM is divided into blocks and decision step 246 determines whether all RAM blocks have been checked. If seven RAM blocks are used, seven self-check sequence cycles must be executed to obtain seven RAM block check sum test 1 values. Step 248 adds all RAM block check sum test values for test pattern 1 together and decision step 250 determines whether the grand total of the RAM block check sum test values for pattern 1 is equal to a predetermined value. If the grand total is not verified, the failure count counter is incremented and the fail safe trap routine is actuated. If the grand total is correct, or if all RAM blocks have not been checked per decision step 246, step 252 repeats the integrity test with a second test pattern for the identified RAM block. Decision block 254 inquires whether a failure is noted in the integrity check, the "yes" branch increments the failure count counter and accesses the fail safe trap routine, the "no" branch jumps the program via flowchart character D2 to the self-check module executive routine, FIG. 2D, at step 140.

Again, for a given type of RAM and a particular manufacturer, the most probable failure modes can be identified and an appropriate algorithm can be used by the RAM self-check module to detect the failure of the RAM. As known to persons of ordinary skill in the art, the ROM and the RAM may be defective or may fail due to: defective address information, defective data information, incorrect programmable read only memories (PROMs) in sockets (which is particularly important when tables of data are used and when two tables may be exchanged allowing the system to run but with incorrect data), and defective memory chips. In one embodiment, the particular RAMs used have a high probability of failure due to connection line failure. Therefore, the RAM self-check module in that embodiment runs specific tests for short traces on the RAM blocks. Other types of RAMs have a failure mode such that data, which is stored in one memory location, is also stored in another memory location proximate the first location. Specific algorithms are known to identify this particular failure mode for the RAM.

Before the detailed discussion of the op code self-check module flowchart of FIG. 2G is provided, the following considerations as to the selection of operation code instructions (op code) for microprocessor 14 should be addressed. The person of ordinary skill in the art recognizes, for a particular microprocessor manufactured by a particular manufacturer, that a great number of op code can be utilized by the microprocessor to obtain a plurality of desired functions. It is an object of the failure safe architecture to check the validity of operation of the microprocessor. Given the universe of op code which the microprocessor recognizes and executes, a number of those op codes have a relatively higher probability of being improperly executed by the microprocessor than do other op code. The person of ordinary skill in the art also recognizes that different groups of op code can be used to achieve the same function although the alternative op code group may be inefficient given a particular attribute of the microprocessor, i.e., the alternative op code group may take a longer time to achieve the desired function as compared with the first group.

In an effort to obtain a low probability of error in the operation of the microprocessor, the universe of op code is limited to a sub-universe of op code which has a relatively higher probability of successful execution by the microprocessor. The selection of the sub-universe of operating codes is based on several factors.

In one embodiment of the present invention, the microprocessor utilized is a Motorola MC6809 8 bit 4 Mhz processor. The limited universe of instructions is based on several of the following considerations:

(1) User Comprehension.

(A) The current state of the microprocessor is dependent on a single event or instruction immediately prior to the instruction of interest.

(B) The instruction affects a single parameter or condition of the microprocessor.

(2) Ability to Adequately Test the Instruction During Self Testing.

(A) The dual branching test is sufficient to test the instruction.

(B) Adequate testing is realizable in real time.

As stated earlier, the op code used by computer system 10 (the sub-universe of op code) are divided into set and each set is sequentially executed by the microprocessor during one self-check sequence cycle. Returning to FIG. 2G, step 280 identifies the op code set to be checked. Step 282 identifies a single op code from that set which is used in step 284 to exercise a single internal register in microprocessor 14. The single op code is one of the simplest op codes which can be recognized by the microprocessor. However, before exercising the internal register with the single op code, the register is checked by walking a "one" through the register to determine whether the register can be properly loaded and does not have a stuck bit therein.

Decision step 286 determines whether the internal register is operating correctly; if not, failure count counter is incremented in step 288 and the fail safe trap routine is actuated in step 290. If the register is properly loaded and does not have a stuck bit, step 292 calls for fully exercising an internal condition register with the major op code from the identified set. Decision step 230 determines whether the condition of the internal register is correct, i.e., whether the internal register has a predetermined condition for the discrete subset; if not, steps 232 and 234 increment the failure count counter and jump to the fail safe trap routine. Otherwise, if the internal register operates correctly, step 236 monitors the unused registers, during the exercising of the particular internal condition register, for the proper values. Decision step 238 determines whether the unused registers contain the correct values; if so, step 240 executes the two-path branch test for the branch and jump instructions in the op code set.

Figure 3:
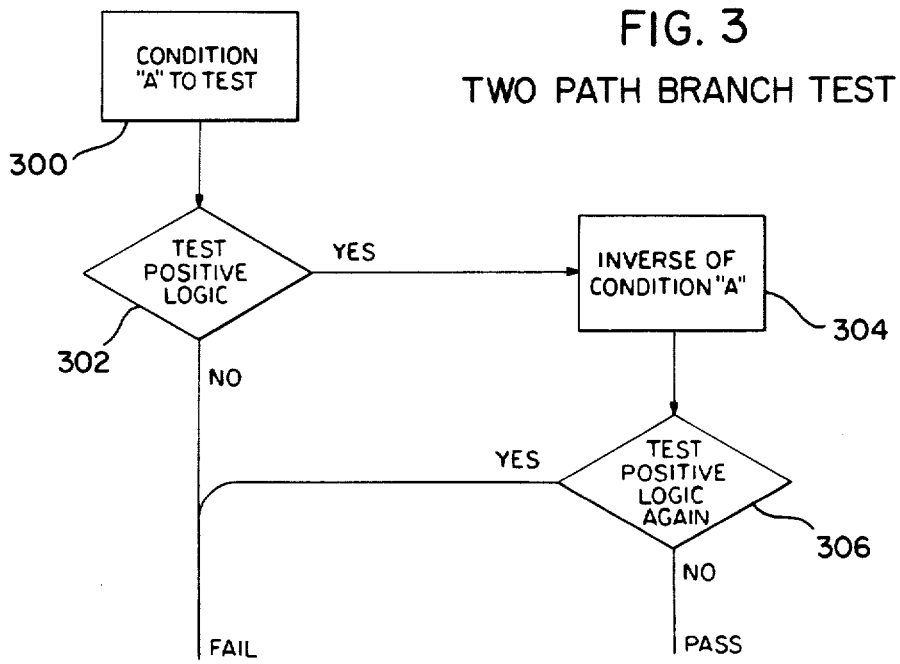
FIG. 3 schematically illustrates the two-path branch test.

The two-path branch test is illustrated in FIG. 3 In general, a data value is obtained from the ROM. The internal register in the microprocessor is set to correspond to the particular data value. This corresponds to establishing condition "A" in step 300 of FIG. 3. Next, the condition of the internal register is checked by a test positive logic step 302. If the condition of the internal register checks positive, the inverse of condition "A" is obtained by, in this example, taking the opposite of the data value per step 304. If operating properly, the internal register should correspond to the inverse of the data value and test positive logic step 306 should result in the "no" branch being followed. If the condition of the register indicates a negative, the two-path branch test is successfully passed. Otherwise, if the first test positive logic of step 302 obtains a negative in the internal register, the "no" branch is taken and a failure is indicated; if the "yes" branch from the second test positive logic step 306 is taken, a failure is also noted. Returning to op code self-check module flowchart of FIG. 2G, decision block 242 determines whether a failure has occurred and steps 244 and 246 increment the failure count counter and jump the program to fail safe trap routine whereas a successful validity check jumps the program via flowchart character D2 to self-check module executive routine, step 140.

In this embodiment, each op code self-check module operates on approximately 50 unique instruction sets. The two-path branch test is utilized to check all branch and jump instructions. The two-path branch test is applied to a series of op code within the identified op code set such that the op code self-check module does interrelated and correlated tests on the operation of the microprocessor as it executes the discrete subsets of op code.

Since the operation of the microprocessor is critical to the overall operation of computer system 10, the self-check sequence cycle includes ROM self-check on ROM block 1; RAM self-check on RAM block 1; op code self-check on op code sets 1, 2, 3, 4 and 5 (wherein computer system 10 only utilizes op code sets 1, 2, 3, 4 and 5); and, after that first cycle, a ROM self-check on ROM block 2; a RAM self-check on RAM block 2; and the op code self-check on op code sets 1, 2, 3, 4 and 5. The remaining ROM blocks and RAM blocks are checked in further sequence cycles.

The various self-check modules are strung together by the pointer value in the self-check pointer register discussed above with respect to step 128 in FIG. 2D, and the next self-check module checks the test value in the test register set by the previous self-check module (see step 130 in FIG. 2D); the self-check sequence is therefore continually monitoring the continuity between each module.

A person of ordinary skill in the art recognizes that each peripheral device subject to control by microprocessor 14 may be tested by the fail safe architecture. There are two basic methods for checking peripheral devices such as PIA controller 18 and related circuits: a full interactive check and a functional check. The full interactive check uses a closed loop feedback to monitor each and every peripheral line. Basically, the line is toggled to a high state and then to a low state to fully exercise the device. A sense line is attached to the line being toggled and that sense line is monitored by the microprocessor. In contrast, the functional check monitors the final output of the peripheral circuit device. The op code self-check module described above can be easily configured to include this feature of checking the operation of the peripheral devices.

Also, the person of ordinary skill in the art recognizes that each peripheral device can be checked for errors or erroneous operation during the power up initialization of computer system 10. The manufacturers of peripheral devices provide adequate instructions for incorporating peripheral device checks. These checks can be incorporated into the op code self-check module discussed above or can be added as a separate peripheral self-check module to the fail safe architecture. The claims appended to the specification encompass such self-checks of peripheral devices.

In the embodiment of the present invention, the fail safe trap routine is duplicated at many locations throughout the ROM. Specifically, a fail safe trap routine is located intermediate each applications routine in the ROM. The applications routine (and self-check module) utilizes a distinct fail safe trap routine.

The fail safe architecture revolves around the production in a critical time period of a fail safe square wave signal from PIA 18 to fail safe circuitry 26 of FIG. 1. At the conclusion of each self-check module, a fail safe control signal is sent to PIA 18 and NMI timer T1 which produces a defined state of the fail safe square wave. Timer T1 times both the high and the low half-periods of the fail safe square wave. In the absence of a timely fail safe trigger signal, the square wave does not have the correct duration period which is detected by fail safe circuit 26 causing fail safe power circuit 28 to inhibit the further execution of op code by microprocessor 14 by disabling the switching transistors between power supply 30 and the +V power inputs of the components of computer system 10. In the presence of timely fail safe trigger signals, within a predetermined window of time, the fail safe power circuit 28 closes the appropriate switching transistor and maintains the continuity of power to the components, i.e., enables the further execution of op code by the microprocessor. In this situation, the fail safe signal is substantially timely received by fail safe circuitry 26.

Figure 4A:
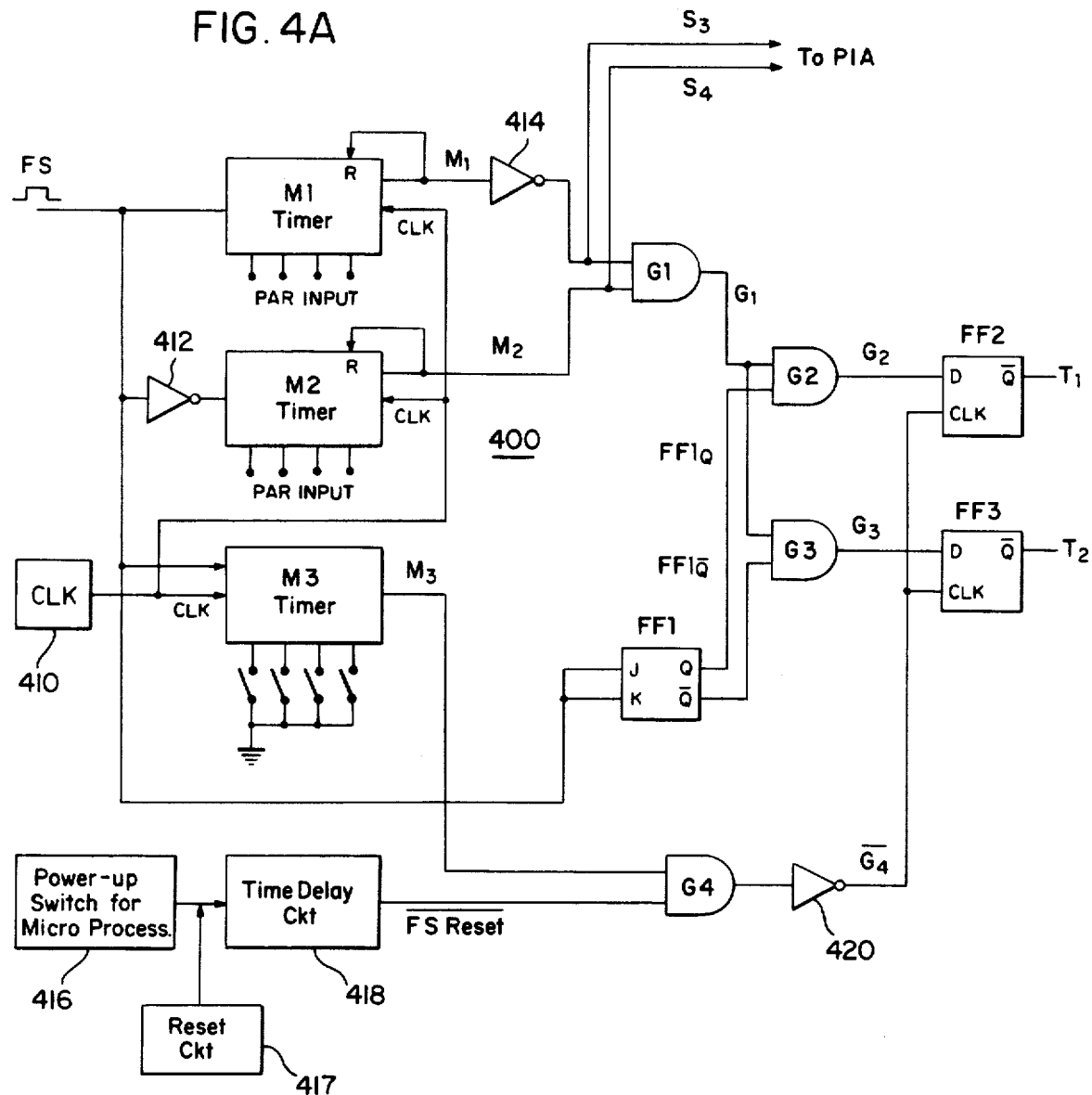
FIGS. 4A and B schematically illustrate the digital, narrow band-pass filter and the pair of switching transistors coupled to the power supply, respectively; and, FIGS. 5A, B and C illustrate timing diagrams for the circuitry in FIGS. 4A and B during normal operation and upon detection of two types of failures.
Figure 4B:
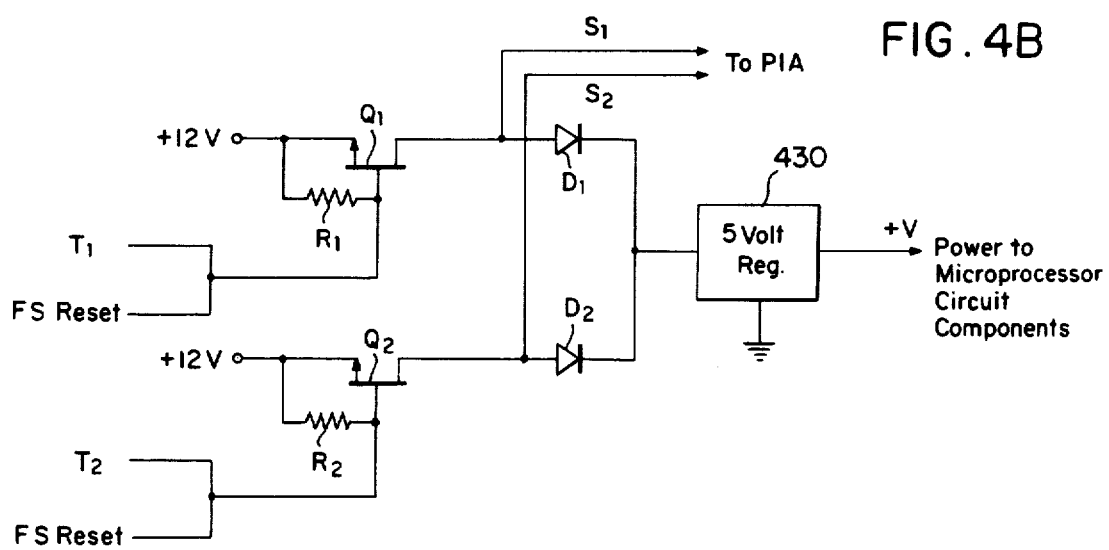

FIGS. 4A and 4B illustrate, in block diagram form, the disabling and enabling circuitry in the fail safe power circuit 28.

Specifically, FIG. 4A shows a narrow band-pass digital filter for fail safe square wave signal identified as "FS". The band-pass filter 400 includes timers M1, M2 and M3. Timers M1, M2 and M3 are clocked by clock circuit 410 which is independent of the clock in computer system 10. The fail safe square wave is applied directly to the input of timer M1 and M3 and the inverse of the fail safe square wave is applied to timer M2 via inverter 412. Timers M1 and M2 are loaded with their countdown time periods at the positive going, leading edge of the fail safe square wave and at the negative going falling edge of the fail safe square wave, respectively. The output of timer M1, designated $M_1$, is applied to inverter 414 and the output of inverter 414 is applied to AND gate G1 along with the output of timer M2, designated $M_2$. The output $G_1$ of AND gate G1 is applied to one input of AND gate G2 and one input of AND gate G3. The other inputs to AND gates G2 and G3 are $FF1_q$ and $\overline{FF1_q}$ from the Q and $\overline{Q}$ outputs of flip-flop FF1 which in turn is fed with the fail safe square wave signal at inputs J and K.

The output $G_2$ of AND gate G2 is applied to the D input of flip-flop FF2. The output $G_3$ of AND gate G3 is applied to the D input of flip-flop FF3.

The output $M_3$ of timer M3 is applied to AND gate G4 which also receives the inverse fail safe reset signal (FS reset). The FS reset signal is developed by either power up switch 416 for the microprocessor or reset circuit 417, both in combination with time delay circuit 418. Therefore, for a predetermined period after the microprocessor 14 is powered up (or after reset circuit 417 is set by the reinitialization per step 52, FIG. 2A), time delay circuit 418 generates a high FS reset signal and the inverse of that high FS reset signal blocks the passage of $M_3$ through AND gate G4. The output of AND gate G4 is inverted by inverter 420 and is designated as $\overline{G_4}$. That signal is applied to the clock inputs of FF2 and FF3. The Q outputs of FF2 and FF3 are timing signals $T_1$ and $T_2$.

Referring to FIG. 4B, timing signal $T_1$ is applied to the base of switch transistor $Q_1$. Resistor $R_1$ applies a bias voltage to the base of transistor Q1 by coupling the 12-volt power supply to that base. The 12-volt power supply is coupled to the emitter of transistor Q1. The FS reset signal is also coupled to the base of transistor Q1.

With respect to timing signal $T_2$, that signal is applied to switch transistor Q2 and resistor $R_2$ biases the base of that transistor accordingly. The FS reset signal is also applied to the base of transistor Q2. The collectors of transistors Q1 and Q2 are coupled respectively to diodes D1 and D2 and the outputs of the diodes are coupled to 5-volt regulator 430. The output of the 5-volt regulator is tied to the +V power terminals of the various components in computer system 10. Transistors Q1 and Q2 are configured as a pair of series pass transistors.

The digital band-pass filter 400 has sense lines $S_3$, $S_4$ coupled to the two inputs of AND gate G1. Those sense lines lead to a peripheral interface adapter (PIA). The output of switching transistors Q1 and Q2 are sensed via sense lines $S_1$ and $S_2$ which are also coupled to a PIA. A resistive network (not shown) converts the voltages of $Q_{1c}$ and $Q_{2c}$ ($S_1$ and $S_2$) to digital levels compatible with the sensing PIA.

In this embodiment, the most critical applications routine has a duration slightly greater than 2.2 seconds. The most critical applications routine is defined as the routine which effects an external device in an important fashion; the device is external to computer system 10. In this embodiment, the most critical function is the transmission of data by the computer system to an external device. The 2.2 seconds is the critical period of time and 51 NMI interrupt signals are generated within that 2.2-second critical time period. The NMI timer T1 generates one square wave for each two interrupts; therefore, 25.5 square waves occur within the 2.2 seconds of critical time. In this embodiment, each self-check module is executed by microprocessor 14 in approximately 300 and 600 microseconds.

Figure 5B:
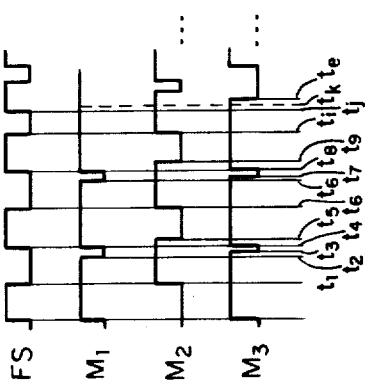
Figure 5C:
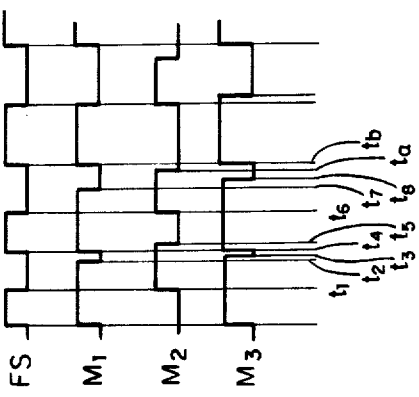
Figure 5A:
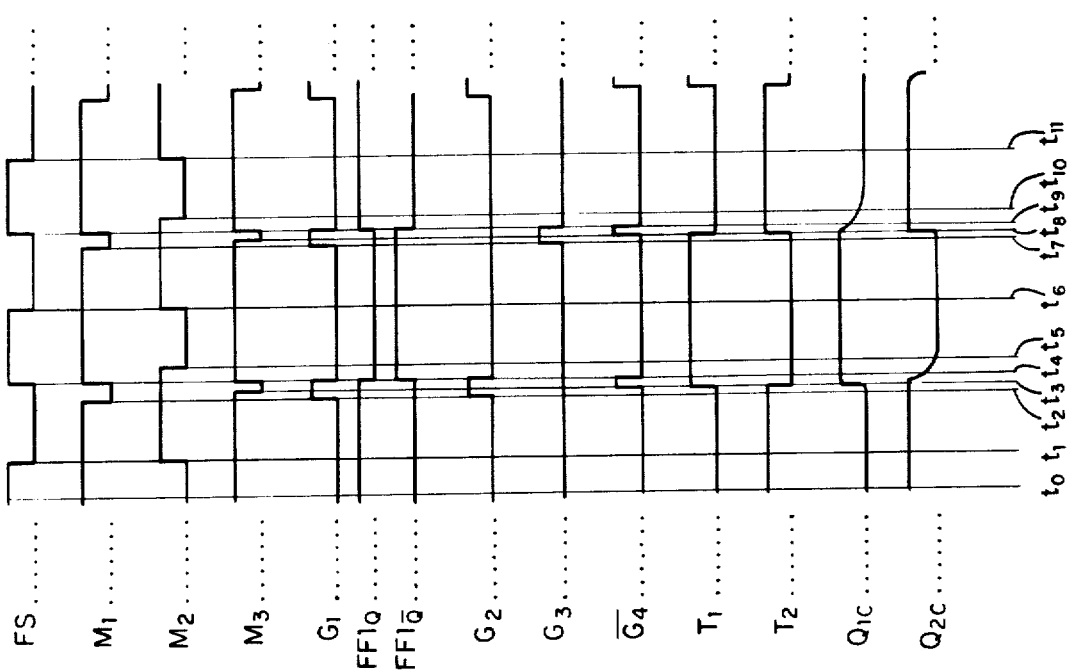

FIG. 5A illustrates the non-failure mode of operation of the fail safe power supply circuit. At time $t_0$, the fail safe square wave (FS) is high. Timer M1 and timer M3 are triggered on the rising edge ($t_4$) of FS with timer M1 timing out at $t_2$ shortly before timer M3 timing out at $t_3$. Timer M2 is triggered on the falling edge of the fail safe square wave FS at time $t_1$ and times out at $t_5$ shortly after the rising edge of FS at $t_4$.

In terms of frequency, the narrow bandwidth digital filter 400 (FIG. 4A) allows the fail safe square wave to switch on one of transistors Q1 or Q2 if the signal is received within a plus or minus 10% window of time of the prescribed fail safe period. Therefore, timer M1 times out 10% before the end of the fail safe period and timer M2 times out 10% after the fail safe period. The duty cycle of the fail safe square wave is 50%.

AND gate G1 produces $G_1$ a logical high signal at time $t_2$ when $M_1$ is low and $M_2$ is high. Flip-flop FF1 triggers one or the other of AND gates G2 or G3; therefore, at time $t_2$, AND gate G2 output $G_2$ is set high due to signal $FF1_q$. Since a high signal is noted at the D input of flip-flop FF2 at the time its clock input receives the $\overline{G_4}$ signal, based upon timer M3 going low at time $t_3$, a high signal $T_1$ is generated at the Q output of flip-flop FF2. This operation assumes that the computer system has been in operation for a period of time such that the system is not being initialized and such that reset circuit 417 is not actuated and the inverse FS reset signal is high. Timing signal $T_1$ is applied to the base of switching transistor Q1; therefore, the 12-volt power supply is coupled to the 5-volt regulator 430 and power is applied to the various components in computer system 10.

At time $t_4$, the rising edge of the fail safe square wave signal is noted; timer M1 is reset, is loaded with a parameter count value and begins counting; timer M3 begins recounting; the output $G_1$ of AND gate G1 goes low due to the high $M_1$ signal; flip-flop FF1 selects gate G3 via the Q output; therefore $G_2$ goes low.

Also, when the $\overline{G}_4$ signal is high, the output $G_3$ of AND gate G3 is low, flip-flop FF3 will clock the low input signal to its output as timing signal $T_2$ and the second transistor Q2 will be turned off. Due to the storage charge in transistor Q2, the transistor does not immediately open the circuit and a continuous supply of power is applied to 5-volt regulator 430 since transistor Q1 is turned on almost instantaneously. This action depends upon time constant due to the storage charge in Q1 and Q2.

At time $t_5$, timer M2 times out.

At time $t_6$, the fail safe square wave exhibits a falling edge, and timer M2 begins to count down. At time $t_7$, timer M1 counts down which raises the output of gate G1 and gate G3 output is switched high due to the $\overline{Q}$ output of flip-flop FF1. At time $t_8$, timer M3 times out, raising clock pulse $G_4$ and producing timing signal $T_2$ by clocking the high signal from gate G3 through flip-flop FF3 to transistor Q2. Simultaneously, at time $t_8$, the low input of flip-flop FF2 is clocked to its output as signal $T_1$ and transistor Q1 turns off. At time $t_9$, the leading edge of the fail safe square wave is noted, timer M1 is turned on and $G_1$ is lowered. The high output pulse of gate G3 from $t_7$ to $t_9$ is clocked via $\overline{G}_4$ clock pulse to the output of flip-flop FF3 as timing signal $T_2$. Therefore, transistor $Q_2$ is switched on at time $t_8$.

FIG. 5B shows a timing diagram when the fail safe square wave increases in frequency. The activity at times $t_1$-$t_9$ correspond to the normal operation depicted in timing diagram FIG. 5A. At time $t_i$, the frequency of the fail safe square wave increases and the next rising edge at time $t_j$ occurs earlier than anticipated. The dashed line at time $t_k$ shows when timer M1 would normally time out. However, since the rising edge of the fail safe square wave is noted at time $t_j$ prior to time out time $t_k$, timer M1 does not time out and maintains itself in a high state (timer M1 is reset by FS). Therefore, at time $t_L$ when timer M3 times out, gate G1 does not produce a high pulse since the inverse of signal $M_1$ is low. Therefore, one of the selected gates G2 or G3 is not supplied with the appropriate timing pulse and the outputs of that selected gate are not clocked through flip-flop FF2 or FF3 as timing signals $T_1$ or $T_2$ and hence one of the switching transistors is not turned on. The 12-volt power supply (see FIG. 4B) is not coupled to 5-volt regulator 430 and power to the computer system 10 is interrupted.

The timing diagram of FIG. 5C illustrates the situation when the fail safe square wave is delayed. At times $t_1$ through $t_8$, operation is normal. At time $t_a$, the leading edge of the fail safe square wave signal has been delayed such that timer M2 counts down and signal $M_2$ falls prior to the rising edge of the fail safe square wave of time $t_b$. Therefore, signal $M_3$ is in a low state while signal $M_2$ falls to a low state. The low state of $M_2$ causes $G_1$ to go low. The low state of $G_1$ causes the A and D gates $G_2$ and $G_3$ to go low. The clock pulse of $\overline{G}_4$ occurs during the low state of $G_2$ and $G_3$ since $\overline{G}_4$ is dependent upon $M_3$. The lowered clock pulse causes the output of FF2, for example, to fall and timing signal $T_1$ is prematurely cut off which opens switching transitor Q1.

As stated earlier with respect to the self-check module executive routine of FIG. 2D, the microprocessor sense the fail safe power supply sense lines after executing the particular self-check module. The sense lines $S_1$, $S_2$, $S_3$ and $S_4$ are sensed at or shortly thereafter times $t_4$, $t_6$, $t_9$ and $t_{11}$. The microprocessor monitors the collector voltages of switching transistors $Q_1$ and $Q_2$ (via a resistive voltage compensation network not shown) and also monitors the inverse of signal $M_1$ and signal $M_2$ at those times.

The fail safe architecture described above with respect to all the figures is fault tolerant in that, if a failure is identified by the architecture, the fail safe trap routine is accessed and shortly thereafter reset timer T2 (see step 114, FIG. 2C) times out and generates a reset interrupt to the microprocessor. At that point, the microprocessor initializes the computer system by executing each self-check module. If all self-check modules successfully test the components, i.e., do not detect a failure or an error condition, the microprocessor will continue executing op code instructions and resume the suspended applications routine. However, a failure count counter is incremented upon detecting any failure and, if the count therein exceeds three failures within 10 NMI interrupts, the fail safe architecture inhibits the production of the fail safe square wave signal and cuts off the power to the computer system. The failure count counter is cleared only if 10 NMI interrupt signals have been noted after any identified failure. See steps 84, 86, 88 and 89 in FIG. 2B.

The fault tolerant fail safe architecture can be utilized to identify the failed component (or faulty operation) and isolate that component from the balance of the system. The microprocessor identifies which self-check module failed to verify the contents of a ROM block, failed to verify the integrity of a RAM block or failed to validate the operation of the microprocessor with a given set of op code by monitoring the self-check pointer register which identifies the executed self-check module. The ROM and RAM blocks are easily identified by the self-check modules. The faulty portion of the computer system is isolated using a look-up table. For example, if a particular ROM block were determined to be defective, the microprocessor could use an alternate set of instructions stored in another ROM block and set a command not to access the faulty ROM block. As for faulty RAM blocks, look-up tables can be utilized and applications routine can be modified. The modification of the applications routine is known to persons of ordinary skill in the art. If the operation of the microprocessor is not validated for a particular set of op code, steps can be taken not to utilize those op code.

The applications routines can check PIAs without significant difficulty. The applications routine toggles the PIA output line on and off and monitors that output line with a sense line (another input line). If during the execution of this self-checking routine a fault is discovered, the PIA is isolated from the system and not used by the applications routine and by other components of the computer system. The particular applications routine can be discarded (i.e., not be used by the computer system), or redundant output lines could be available from different PIAs which function as desired.

The fail safe architecture and the method of protection are not absolutely guaranteed to detect a failure. However, the architecture does detect to a high degree of certainty a single failure and to a lower degree of certainty multiple failures.

To provide an estimate of how reliable the fail safe architecture detection method is, assume that each self-check module and applications routine check method is independent (but not mutually exclusive) and assume the probabilities to be a simple linear sum.

With respect to the self-check module software, assume that a failure in ROM, RAM (only one ROM or RAM block of 128 bytes is checked during one sequence cycle comprising six self-check module routines), microprocessor or interconnect occurs. Assume that the self-check module detects this failure. There are six self-check routines, one executing every millisecond. The average time to execute is 200 microseconds. A failure will be detected in six (6) routines times (1 ms+0.2 ms)=7.2 ms. To ensure that an error in an 8K block of RAM and ROM is detected

8192 BYTES/12 BYTES/TEST = 64 TESTS

64 TESTS×7.2 ms/TEST = 460.8 ms.

As for the fail safe power supply failure, the fail safe power supply has two methods of failure detection:

(1) self-check by the microprocessor once each 1.2 ms; and (2) when the frequency of the fail safe square wave is altered, the power supply decays in 0.5 ms.

To obtain the total probability of undetectable error (probability of multiple failure before detection of single error), the previous analysis of failure has assumed each block is 100% effective in detecting a failure. The second problem of determining the probability of undetectable failure is somewhat simpler.

Assume that a single detectable failure occurs. Before this failure is detected, a second failure may occur that could mask the first. This is an undetectable condition.

To further simplify the problem, consider only six types of components. These are defined as the components checked in each of the six self-test modules.

Since the tests are periodic, a component other than total memory can be monitored each 7.2 ms. Thus, a double failure must occur during this period.

Consider a 1000-hour operating period. Table No. 1 shows typical reliability figures for the component types. There are $$1000 \text{ hrs}/ \left[ 7.2 \times 10^{-3} \frac{\text{sec.}}{\text{test}} \cdot \frac{1 \text{ Hr}}{3600 \text{ sec}} \right] = 500 \times 10^6 \text{ test periods}$$

within which a multiple error could occur. (Each period is $7.2 \times 10^{-3}$ seconds long.)

TABLE 1

| Type | Group | 1 Failure/$10^6$ Hours | |
|---|---|---|---|
| CPU + MSI | 1,2,3 | 110 + 11 | $P_{FG1}, P_{FG2}, P_{FG3}$ |
| RAM | 4 | 140 | $P_{FG4}$ |
| ROM | 5 | 140 | $P_{FG5}$ |
| MITEL | 6 | 110 | $P_{FG6}$ |

$P_{FG1T}$ = Probability of a Group 1 Failure Total
$P_{FG1}$ = Probability of a Group 1 Failure
The probability of a group failure is
$P_{FG1T} = P_{FG1} \cdot 1000 \text{ HRS} = 121 \times 10^{-3}$ Failures
$P_{FG2T} = P_{FG2} \cdot 1000 \text{ HRS} = 121 \times 10^{-3}$ Failures
$P_{FG3T} = P_{FG3} \cdot 1000 \text{ HRS} = 121 \times 10^{-3}$ Failures
$P_{FG4T} = P_{FG4} \cdot 1000 \text{ HRS} = 140 \times 10^{-3}$ Failures
$P_{FG5T} = P_{FG5} \cdot 1000 \text{ HRS} = 140 \times 10^{-3}$ Failures
$P_{FG6T} = P_{FG6} \cdot 1000 \text{ HRS} = 110 \times 10^{-3}$ Failures
The probability of two failures occurring in $P_T =$ TABLE 1-continued $$\sum_{I=1}^{5} P_{FGI} \sum_{J=I+1}^{6} P_{FGJ}$$

The actual probability of an undetectable failure requires the double failure to occur within one 7.2 ms period or $1/500 \times 10^6$ of the total 1000-hour period. Represented mathematically this is $P_t = 2 \times 10^{-9}$ failures/1000 hours While only certain preferred features of the invention have been shown by way of illustration, many modifications and changes can be made. It is to be understood that the appended claims are intended to cover all such modifications and changes as fall within the true spirit and scope of this invention.

We claim:

1. Fail safe architecture for a computer system, said computer system having a processor with an internal register, a storage means for storing at least operation code instructions executable by said processor, and a temporary memory storing at least data manipulated by said processor, the fail safe architecture comprising:
   means for verifying the contents of said storage means by performing an operation upon the contents according to an algorithm;
   means for testing the integrity of said temporary memory including:
      means for saving the current data stored in said temporary memory connected to said means for testing;
      means for writing a test pattern into said temporary memory and verifying said test pattern connected to said means for testing; and,
      means for restoring said current data in said temporary memory connected to said means for testing;
   means for checking the validity of operation of said processor by executing said operation code instructions in discrete subsets and monitoring the condition of said internal register during the execution;
   menas for periodically activating said means for verifying, said means for testing, and said means for checking the validity. during the execution of said operation code instructions by said processor; and,
   means for inhibiting the execution of said operation code instructions by said processor dependent upon the verification of said storage means, the testing of the integrity of said temporary memory, and the validity check of the operation of said processor by the respective said means for verifying, said means for testing and said means for checking the validity.

2. Fail safe architecture as claimed in claim 1 wherein said means for verifying the contents of said storage means includes means for ascertaining whether said algorithm, as applied to said stored operation code instructions, produces a desired resultant; said means for testing the integrity of said temporary memory includes means for determining whether said test pattern, as written into said temporary memory, is verified; said means for checking the validity of operation of said processor includes means for initially checking the operation of said internal register and a comparison means for determining whether the condition of said internal register corresponds to a respective predetermined condition for said execution of the discrete subset; and the fail safe architecture including means for generating a fail safe trigger signal which is independently actuated by said means for ascertaining, said means for determining and said comparison means, said fail safe trigger signal being applied to said means for inhibiting and being representative of said verification of said storage means, said integrity of said temporary memory and said validity of the operation of said processor.

3. Fail safe architecture as claimed in claim 2 wherein said means for inhibiting includes means for enabling the further execution of said operation code instructions by said processor if said fail safe trigger signal is substantially timely received from said means for generating.

4. Fail safe architecture as claimed in claim 3 including a fail safe trap means for delaying the generation of said fail safe trigger signal by said means for generating if said means for ascertaining does not produce said desired resultant, if said means for determining determines that said test pattern is not verified, if said means for initially checking the operation of said internal register is unsuccessful, and if said comparison means determines that said predetermined condition of said internal register is not present during the execution of said discrete subset of operation code instructions, said fail safe trap means being independently actuated to delay said fail safe trigger signal such that given the unsuccessful verification of said storage means, the unsuccessful integrity test of said temporary memory and the unsuccessful validity check of the operation of said processor, said fail safe trigger signal is not substantially timely generated by said means for generating and is not substantially timely received by said means for enabling thereby causing said means for inhibiting to inhibit the execution of said operation code instructions by said processor.

5. Fail safe architecture as claimed in claim 4 wherein said fail safe trap means includes means for resynchronizing the operation of said processor with a series of recognizable, single character operation code words.

6. Fail safe architecture as claimed in claim 4 wherein said storage means is primarily a read only memory (ROM) which stores said operation code instructions and which stores permanent look-up tables and constants utilized by said processor; said ROM being divided into blocks of ROM for purposes of the fail safe architecture; and, said means for verifying including means for sequentially verifying the contents of each block of ROM.

7. Fail safe architecture as claimed in claim 6 wherein said algorithm utilized to verify the contents of said ROM is one of a convolutional or a cyclic redundancy code algorithm which, when applied to each block of ROM, obtains a check sum value; said means for ascertaining determining whether said check sum value compares favorably or unfavorably to said desired resultant and actuating said means for generating said fail safe trigger signal with a favorable comparison representing a successful verification and actuating said fail safe trap means with an unfavorable comparison representing an unsuccessful verification.

8. Fail safe architecture as claimed in claim 7 wherein said storage means includes a predetermined portion of additional temporary memory which stores changeable look-up tables and changeable constants, the contents of said predetermined portion of additional temporary memory being verified by said means for verifying.

9. Fail safe architecture as claimed in claim 4 wherein said temporary memory is a random access memory (RAM), said RAM being divided into blocks of RAM for purposes of the fail safe architecture; said means for testing the integrity of said RAM including means for sequentially testing each block of RAM; said means for writing utilizing at least two test patterns, both test patterns being sequentially written into one block of RAM and sequentially verified during a single integrity test of said one block of RAM; said means for determining whether said test pattern is algorithmically verified including means for checking an algorithmic check sum against a predetermined algorithmic check sum corresponding to the test pattern and means for actuating said means for generating said fail safe trigger signal upon a favorable and successful integrity test and for actuating said fail safe trap means upon an unfavorable and unsuccessful integrity test of said one block of RAM.

10. Fail safe architecture as claimed in claim 9 wherein said means for testing the integrity of said RAM includes means for summing the algorithmic check sums of all the tested blocks of RAM and means for checking the resulting grand total algorithmic check sum obtained from said means for summing against a predetermined grand total algorithmic check sum.

11. Fail safe architecture as claimed in claim 4 wherein said internal register is a condition code register; said means for checking the validity including means for fully exercising said condition code register with the operation code instructions of said discrete subset; and means for conducting a two-path branch test on the branch instructions in said discrete subset.

12. Fail safe architecture as claimed in claim 11 wherein said means for conducting said two-path branch test includes means for testing the positive logic of a designated branch instruction utilizing condition "A", means for obtaining the inverse of condition "A" and further means for testing the positive logic utilizing the inverse of condition "A".

13. Fail safe architecture as claimed in claim 4 wherein at least one group of said operation code instructions defines an applications routine which includes a unique applications routine code word; the fail safe architecture including means for initially loading said applications routine code word into a designated memory location and including means for reading and comparing said applications routine code word against a check code word, said means for reading and comparing being accessed by said applications routine a plurality of times during the execution of said applications routine by said processor; and the fail safe architecture including means for actuating said fail safe trap means if said check code word does not favorably compare against said applications routine code word.

14. Fail safe architecture as claimed in claim 7 wherein said means for verifying, said means for ascertaining, said means for generating said fail safe trigger signal, and said means for sequentially verifying the contents of each block of ROM define a ROM self-check module.

15. Fail safe architecture as claimed in claim 10 wherein said means for testing the integrity of said temporary memory, said means for saving, said means for writing, said means for restoring, said means for determining whether said test pattern is verified, said means for generating said fail safe trigger signal, said means for sequentially testing each block of RAM, said means for checking an algorithmic check sum, and said means for actuating said means for generating said fail safe trigger signal define a RAM self-check module.

16. Fail safe architecture as claimed in claim 12 wherein said means for checking the validity of operation of said processor, said means for initially checking said internal register, said comparison means, said means for generating said fail safe trigger signal, said means for fully exercising said condition code register as said internal register, said means for conducting said two-path branch test, said means for testing the positive logic, said means for obtaining, and said further means for testing the positive logic define an op code self-check module.

17. Fail safe architecture as claimed in claim 14 including first and second timing means, said first timing means being part of said means for periodically activating, being free running with respect to the operation of said processor and independently generating a periodic interrupt at predetermined time periods to said processor; said processor including means for servicing said periodic interrupt and for suspending the current execution of said operation code instructions, for storing intermediate computational information and for accessing a means for actuating said self-check module; said second timing means generating a reset signal after a first predetermined time which is greater than the duration of said predetermined time period, said reset signal being received by a means for initializing said computer system, the initializing means being part of said processor, said second timing means being reset by said fail safe trigger signal; and a means generating a fail safe power supply signal for a predetermined time span which is received by said means for enabling, said means for generating being actuated by said fail safe trigger signal.

18. Fail safe architecture as claimed in claim 17 wherein said means for enabling and said means for inhibiting define a narrow bandpass digital filter means which allows said fail safe power supply signal to pass therethrough if said fail safe power supply signal is received within a predetermined time window and to activate a switch means which supplies power to said computer system, if said fail safe power supply signal is not received within said predetermined time window, said digital filter does not allow said fail safe power supply signal to pass, said switch means is not activated and the power is not supplied to said computer system.

19. Fail safe architecture as claimed in claim 18 including means for sensing the state of said digital bandpass filter at predetermined timing points after said generation of said fail safe trigger signal.

20. Fail safe architecture as claimed in claim 17 wherein said self-check module operates transparently, in the background with respect to the execution of said operation code instructions by said processor.

21. Fail safe architecture as claimed in claim 17 wherein said initializing means includes means for initially activating said self-check module prior to the execution of said operation code instructions by said processor; and said fail safe architecture including means for maintaining a count of the number of times said reset signal is generated within a predetermined number of interrupts from said first timing means; and means for activating said fail safe trap means when said count exceeds a defined number.

22. Fault tolerant fail safe architecture for a computer system, said computer system having a processor with an internal register, a storage means for storing at least operation code instructions executable by said processor, and a temporary memory storing at least data manipulated by said processor, the fail safe architecture comprising:
a first self-check module means for verifying the contents of said storage means by performing an operation upon the contents according to an algorithm;
a second self-check module means for testing the integrity of said temporary memory including:
means for saving the current data stored in said temporary memory;
means for writing a test pattern into said temporary memory and verifying said test pattern; and,
means for restoring said current data in said temporary memory;
a third self-check module means for checking the validity of operation of said processor by executing said operation code instructions in discrete subsets and monitoring the condition of said internal register during the execution;
means for periodically activating said first, second and third self-check module means during the execution of said operation code instructions by said processor;
means for identifying which self-check module failed to verify, test or validate the corresponding portion of said computer system;
means for isolating said corresponding portion of said computer system; and
means for inhibiting the execution of said operation code instructions by said processor if said corresponding portion is identified as critical to the operation of said computer system or if further self-check modules fail to verify, test, or validate further portions of said computer system.

23. Method for establishing the fail safe operation of a computer system, said computer system having a processor which executes operation code instructions stored in said computer system, which utilizes an internal register during the execution and which utilizes a temporary memory to store data manipulated thereby, the fail safe method comprising the steps of:
checking the contents of the stored operation code instructions by performing an operation upon the contents according to an algorithm;
saving the current data stored in said temporary memory;
verifying a test pattern written into said temporary memory;
restoring said current data in said temporary memory;
checking the validity of operation of said processor by executing discrete subsets of said operation code instructions and monitoring the condition of said internal register;
the steps of saving, verifying and restoring being performed during an integrity check of said temporary memory and the steps of checking the contents, integrity checking, and checking the validity occurring periodically and transparently with respect to the execution of said operation code instructions by said processor; and,
inhibiting the execution of said operation code instructions by said processor if said checking the contents, said integrity checking or the validity check is unsuccessful.

24. A method of fail safe operation as claimed in claim 23 wherein the success of said checking the contents of said stored operation code instructions depends upon whether the operation performed to said contents produces a desired resultant, the success of said integrity checking depends upon whether the verification of said test pattern produces a known value; and the success of said validity check depends upon initially validating the operation of said internal register and determining whether the condition of the internal register conforms to a respective predetermined condition during the execution of the discrete subset.

25. A method of fail safe operation as claimed in claim 24 wherein the steps of checking the contents, integrity checking, and checking the validity are self-check modules; and the method includes the step of periodically and sequentially executing all said self-check modules over a predetermined period of time.

26. A method of fail safe operation as claimed in claim 25 wherein a group of said operation code instructions defines an applications routine and said processor executes a plurality of applications routines defined by a plurality of groups; and wherein said predetermined period of time is shorter than the time of execution of the most critical of said plurality of applications routines.

27. A method of fail safe operation as claimed in claim 26 wherein the step of inhibiting the execution of said operation code instructions is accomplished by interrupting the power supplied to said computer system.

28. A method of fail safe operation as claimed in claim 27 wherein before the interruption of said power to said computer system, all self-check modules are reexecuted.

29. A method of fail safe operation as claimed in claim 28 including the steps of suspending the execution of said applications routine before the execution of a particular self-check module, storing all intermediate values developed by said computer system, and restoring said intermediate values and reinstituing the suspended execution of said applications routine after successful completion of said self-check module.

30. A method of fail safe operation as claimed in claim 29 wherein said operation code instructions are stored in a read only memory (ROM) and said temporary memory is a random access memory (RAM), the self-check module step of checking the contents is defined as a ROM self-check module, the self-check module step of integrity checking is defined as a RAM self-check module, and the self-check module step of checking the validity is defined as an op code self-check module, said ROM being divided for purposes of the fail safe operation into a plurality of blocks of ROM, said RAM being divided for purposes of the fail safe operation into blocks of RAM, and the operation code instructions being divided for purposes of the fail safe operation into sets of op code, wherein the step of periodically and sequentially executing all said self-check modules includes the steps of performing said ROM self-check module on a first block of ROM, performing said RAM self-check module on a first block of RAM, performing said o code self-check module on a first set of op code, performing said op code self-check module sequentially on the remaining sets of op code, performing said ROM self-check module on another block of ROM, performing said RAM self-check module on another block of RAM, and performing said op code self-check module sequentially on said first and said remaining sets of op code, and repeatedly performing said ROM, RAM and op code self-check modules until all blocks of ROM and RAM are checked and integrity checked, and then returning to check said first blocks of ROM and RAM.

31. A method of fail safe operation as claimed in claim 30 wherein said RAM self-check module includes the steps of writing a first test pattern into the designated block of RAM and verifying said first test pattern and then writing a second test pattern into said designated block of RAM and verifying said second test pattern.

32. A method of fail safe operation as claimed in claim 31 wherein said operation code instructions include branching instructions and said op code self-check module includes the step of testing said branch instructions with positive logic step utilizing condition "A" and further testing said branch instructions with the positive logic step utilizing the inverse of condition "A".

* * * * *